June 20, 1944.  C. B. SEEM  2,351,839
DOUGH DIVIDER
Filed May 18, 1943  5 Sheets-Sheet 1

Fig. 1.

INVENTOR.
Charles B. Seem
BY
Church & Church
HIS ATTORNEYS

June 20, 1944.　　　　C. B. SEEM　　　　2,351,839
DOUGH DIVIDER
Filed May 18, 1943　　　5 Sheets-Sheet 4

INVENTOR.
Charles B. Seem
BY
Church & Church
HIS ATTORNEYS

June 20, 1944.　　　C. B. SEEM　　　2,351,839
DOUGH DIVIDER
Filed May 18, 1943　　　5 Sheets-Sheet 5

INVENTOR.
Charles B. Seem
BY
Church & Church
HIS ATTORNEYS

Patented June 20, 1944

2,351,839

UNITED STATES PATENT OFFICE 2,351,839

DOUGH DIVIDER

Charles B. Seem, Beacon, N. Y., assignor to Dutchess Tool Company, Inc., Beacon, N. Y., a corporation of New York Application May 18, 1943, Serial No. 487,508

21 Claims. (Cl. 107—15)

This invention relates to improvements in dough handling apparatus and, particularly, to that type of baker's machinery commonly referred to as dough dividers, wherein increments of dough are severed from a mass of dough in a hopper and transferred to one or more scaling or measuring pockets, each of which is adapted to receive a certain amount of dough, whereby each successive increment delivered to the scaling pockets is divided into two or more lumps of predetermined weight.

One object of the present invention is to provide a divider of this type in which a minimum number of moving parts are exposed at the exterior of the machine, thus materially increasing the safety factor of the machine so far as concerns the possibilities of attendants being injured while operating the machine.

In this connection, these machines usually embody means for varying or regulating the size of the scaling or measuring pockets, and a further object is to provide a regulating mechanism that remains stationary during the normal operation of the machine, whereby adjustment of the pockets, at any time, is facilitated.

More specifically, the invention contemplates a dough divider of the type indicated, wherein the measuring pockets are stationary, the dough being transferred from the hopper to said pockets by a moving transfer head which moves into and out of registry with the pockets and being forcibly expelled from said pockets by suitable pressure actuated means, the operation of which is synchronized in such relation to the movement of the transfer head as to expel the lumps of dough from the pockets while the head is out of registry with said pockets.

Another object is to provide a dough divider wherein the quantity of dough withdrawn from the dough hopper can be readily varied or regulated, depending upon the size of the lumps it is desired to form.

In carrying out the present invention it is preferred that the transfer head and the mechanism for expelling the divided lumps from the measuring pockets be fluid actuated, although other forms of motive power are susceptible of use.

The scaling or measuring pockets have reciprocating plungers therein which are retractable a predetermined distance, depending upon the size of the lumps it is desired to form in the machine, while the advance movement of the plungers expels the lumps from the pockets, and a still further object of the invention is to provide a simplified arrangement of plungers which will permit them to be readily wholly removed from the pockets when it is necessary to clean the machine.

With these and other objects in view, the invention consists in certain details of construction and combinations and arrangements of parts, all as will hereinafter be more fully explained and the novel features thereof particularly pointed out in the appended claims.

In the accompanying drawings.

Figure 1:
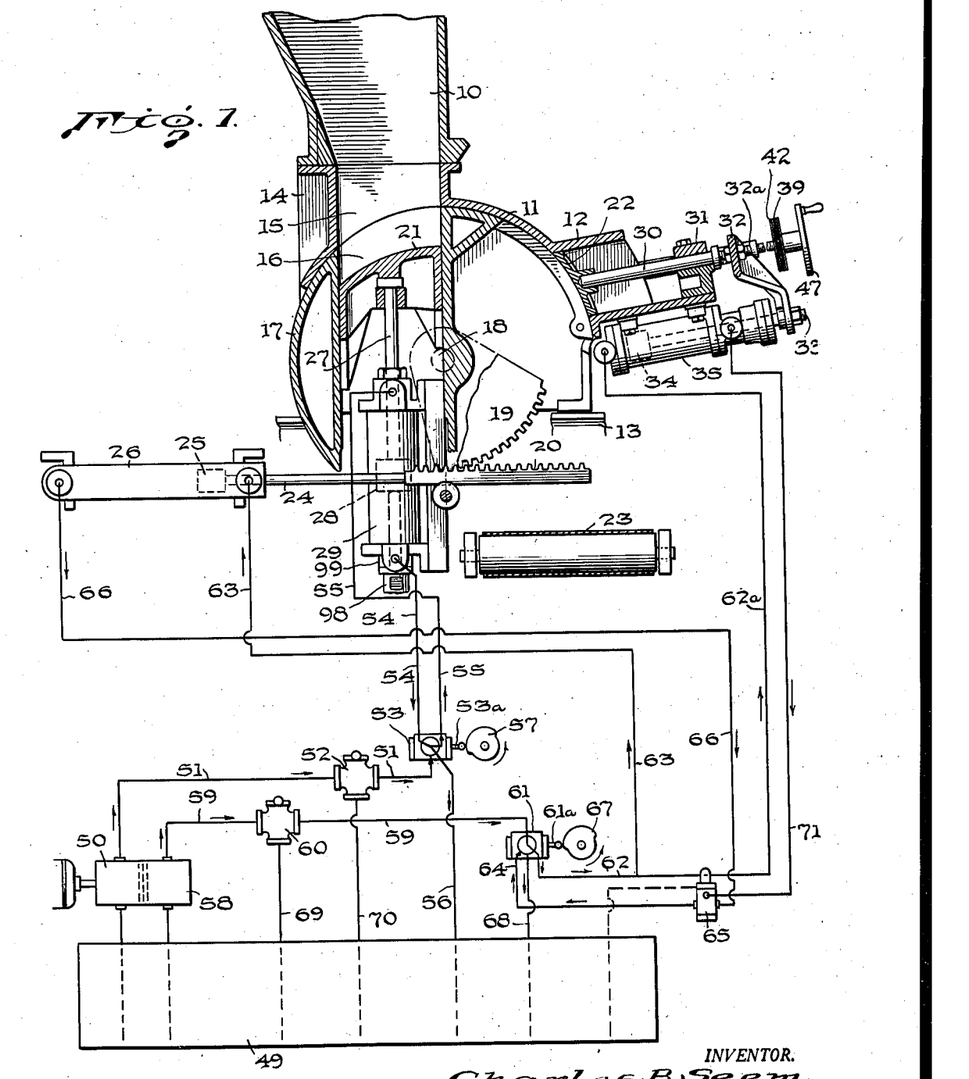
Figure 1 consists of a vertical cross-sectional view through the hopper, transfer head and measuring or scaling pockets of a dough divider, illustrating the preferred embodiment of the present invention, and a diagrammatical illustration of an arrangement for hydraulically actuating said structural elements which are shown in the positions they occupy while dough is fed from said hopper to the so-called transfer head.
Figure 2:
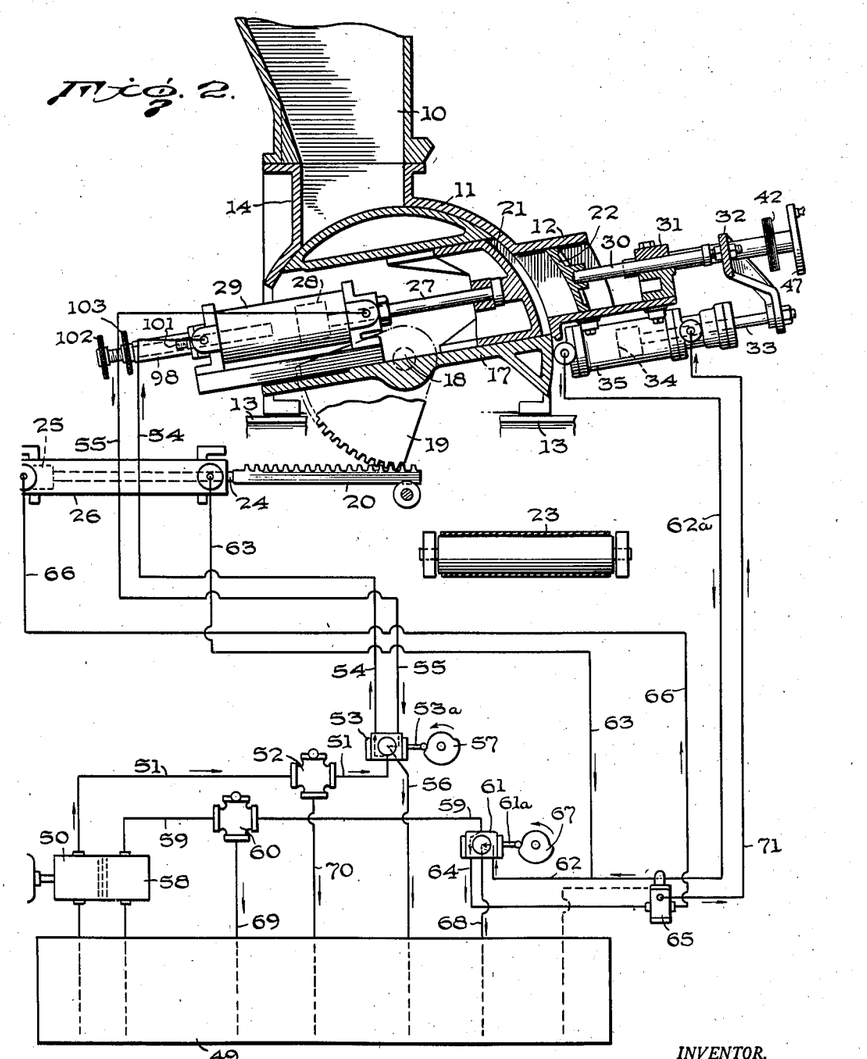
Fig. 2 is a similar view illustrating the transfer head positioned in registry with the scaling pockets of the divider head.

As the mechanism for withdrawing the dough from the hopper and dividing it into lumps of desired size constitutes the essence of the present invention, disclosure and detailed description of the supporting frame and the mounting of the various instruments thereon is deemed unnecessary. Suffice it to say that the hopper 10 is rigidly mounted on a casting 11 which may be termed the divider head, and comprises the scaling pockets 12. This casting or divider head is, in turn, rigidly mounted on the frame of the machine, a portion of which is indicated at 13. The casting 11 has an extension 14 having a passage 15 which serves as the hopper discharge opening through which dough from hopper 10 passes into a compartment 16 in the so-called transfer head 17, which may be moved back and forth to alternately position said compartment 16 in registry with said passage 15 and the scaling pockets 12. Preferably, casting 12 is formed with a curved inner surface and the transfer head is semi-circular in cross-section and has a rocking or oscillating motion for the purpose of positioning its compartment 16 in registry with the hopper and scaling pockets, as shown in Figs. 1 and 2, respectively. For instance, the transfer head may be mounted on a shaft 18 journaled in the sides of frame 13 and adapted to be rocked by means of a segment 19 mounted on the shaft and a reciprocatory rack 20 which is actuated as will be later described.

Slidable in compartment 16 of the transfer head is a plunger 21 which is adapted to be retracted when the compartment is in dough-receiving position in registry with the hopper discharge and to be advanced when said compartment is in registry with the scaling pockets to force the dough from said compartment into said pockets. Similarly, each scaling pocket 12 has a plunger 22 slidable therein for discharging the lumps from said pockets after the transfer head has returned to its dough-receiving position. The lumps of dough from the scaling pockets are received on an endless traveling conveyor belt 23 by which they are conveyed to any desired point. As thus far described, the operation of the machine consists in charging an increment of dough from the hopper into compartment 16 of the transfer head while the latter is in the position illustrated in Fig. 1; moving the transfer head to the position shown in Fig. 2, where the dough in compartment 16 is forcibly transferred into the scaling pockets; returning the transfer head to its original position; and discharging the lumps from the pockets.

These movements of the several parts are imparted thereto in proper timed relationship, preferably by hydraulically actuating the plunger 21 in the transfer head; the rack 20; and the plungers 22 in the scaling pockets, but it is preferred that the plungers 22 only be advanced hydraulically so that their retraction will depend upon the dough being forced into their respective pockets, for reasons which will presently appear. For instance, rack 20 is carried by or forms a part of piston rod 24 of a piston 25 in a cylinder 26, and plunger 21 is carried by piston rod 27 of piston 28 in cylinder 29, the latter being mounted on the transfer head to swing with said head. Thus, by admitting actuating fluid to one end or the other of said cylinders 26, 29, the rack 20 and the plunger 21 can be moved back and forth as desired. On the other hand, each plunger 22 in the scaling pockets is provided with a stem 30 slidable in a sectional bracket or guide having a detachable top plate 31 and the outer ends of said stems are adapted to engage a cross-plate 32 mounted on piston rod 33 of a piston 34 in a cylinder 35. As the stems 30 are not attached to cross-plate 32, it will be apparent that the stems will be advanced by said plate only when in contact therewith and that said plate can be retracted by piston 34 without affecting the plungers 22, leaving the latter in their previously advanced position until they are forced back in their pockets and against plate 32 by dough entering the pockets. Hence, by determining the distance plate 32 is retracted, the inward or retractive movement allowed plungers 22 under the influence of dough forced into the pockets can be regulated. For this purpose, adjustable stops are provided for limiting the retraction of plate 32 and, as previously indicated, it is preferred that these stops be carried on a fixed portion of the exterior of the machine frame. Preferably, at each side of the pockets 12 there is a socket 36 formed in the divider head or machine frame and fixedly mounted in these sockets are extensions 37 having adjusting screws 38 threaded therein. Splined on each screw is a sprocket wheel 39 and a sleeve 40 having a crank 41, and connecting said sprockets is a sprocket chain 42. Each sprocket is preferably attached to its sleeve 40 and, by turning either screw, the latter with the sprockets and chain can be moved longitudinally of the pockets toward or from the outer ends of the extensions 37. The sprockets 39 are adapted to function as stops for the cross-plate 32, and the latter is preferably supported at its ends on seamless tubes 43 which, in turn, are slidable on extensions 37. Thus, when the plate 32 is moved outwardly under the influence of dough entering the scaling pockets, the limit of such retractive movement will be determined by the location of the sprockets 39. As will be apparent, by turning screws 38 to move the sprockets away from extensions 37, the cross-plate will have an increased retractive movement under the influence of cylinder 35, so as to permit a larger quantity of dough to enter the individual scaling pockets and, conversely, the closer to the extensions 37 the sprockets are positioned, the less dough can enter said pockets, as the plungers 22 can only be forced inwardly of their pockets until their stems 30 contact cross-plate 32. While each screw 38 is shown provided with a crank, one crank will suffice, although it is preferred to have a crank at each side of the machine for the convenience of the attendant. It is also preferred to provide an index for denoting the adjustments made with screws 38. Such indexing mechanism may take the form of a gauge bar 44 having graduations 45 thereon and slidable in a tubular housing 46 by means of an annular flange 47 on one of sleeves 40 engaging in a recess in said bar. The graduation in registry with the end of tubular housing 46 denotes the relative position of sprockets 39.

Figure 3:
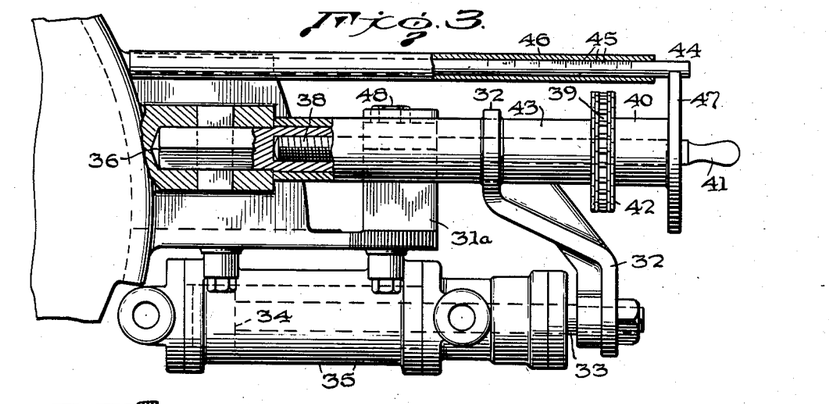
Fig. 3 is an enlarged side elevation, partly in section, of the indexing mechanism for regulating the size of the scaling pockets.
Figure 4:
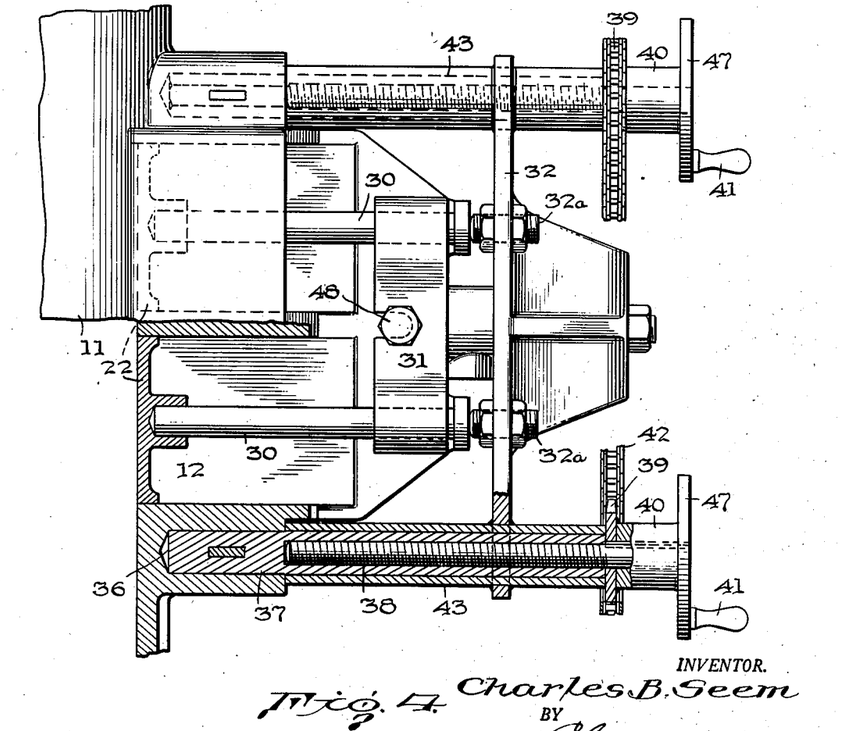
Fig. 4 is a top plan view, partly in section, of the structure shown in Fig. 3.
Figure 5:
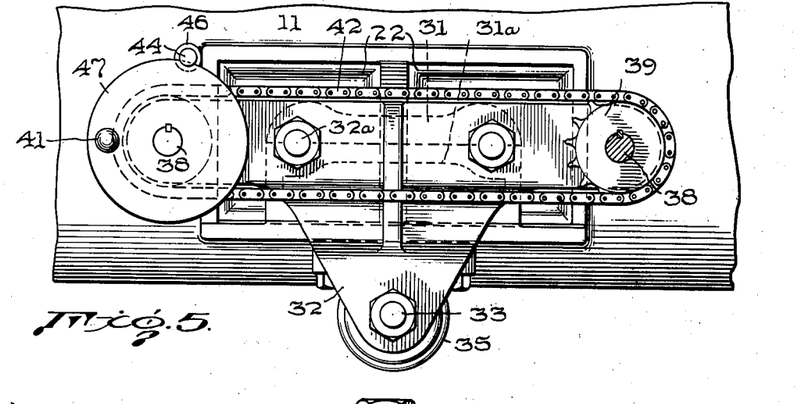
Fig. 5 is an end elevation of the mechanism shown in Figs. 3 and 4.

As best illustrated in Figs. 1, 3 and 4, cylinder 35 for actuating cross-plate 32 is mounted below the scaling pockets and the lower portion of the pocket wall is extended rearwardly or outwardly to form a support for the sectional bracket or guide in which the stems 30 of plungers 22 are slidably supported. The lower portion 31ª of the bracket or guide may be rigidly fixed to the pocket wall extension, but, as previously described, the top-plate 31 may be detached by removing its securing bolt 48. With the top plate removed, and cross-bar 32 retracted, the plungers 22 can readily be slipped out of their pockets because, as pointed out, the plunger stems are not attached to said cross-plate, but are only adapted to abut against said plate. In this connection, in lieu of the plunger stems actually engaging cross-plate 32, the latter may be provided with adjustable stops or contact pieces 32ª which will permit closer regulation of the retractive movement permitted plungers 22.

The pistons in the several actuating cylinders may be hydraulically operated, as shown diagrammatically in Figs. 1 and 2. Actuating fluid from supply tank 49 can be forced by a pump 50 through line 51 in which there is a relief valve 52, to a two way valve 53 from which the fluid can flow either through line 54 to one end of cylinder 29 or through line 55 to the other end of said cylinder. The fluid drains through one of said lines 54 or 55 from one end of the cylinder back to valve 53, when fluid is being supplied to the opposite end of said cylinder, and from said valve 53 the drained fluid returns through line 56 to the supply tank. Operation of valve 53 is controlled by an actuating cam 57. Actuating fluid for cylinder 26, controlling the rocking of transfer head 17, is supplied thereto from tank 49 by a pump 58 through line 59 having a relief valve 60 therein, to and through a two-way control valve 61 which directs the fluid either through lines 62 and 63 to that end of the cylinder 26, which will effect movement of the transfer head from its charging position (Fig. 1) to its discharging position (Fig. 2), or through line 64 to a pressure controlled valve 65, and then through line 66 to that end of cylinder 26 which will effect the return of the transfer head from its discharging position to its charging position. The two-way valve 61 is controlled by a cam 67 and the fluid which returns or drains from opposite ends of cylinder 26, alternately, is diverted by valve 61 to the tank 49 through line 68. Relief valve 60 drains to tank 49 through line 69 and relief valve 52 drains to said tank through line 70.

Fluid for cylinder 35, controlling the pocket plungers 22 in the scaling pockets, is supplied to said cylinder either through a branch 62ª of line 62, or through pressure controlled by-pass valve 65 and line 71. The function of pressure controlled by-pass valve 65 is to control the flow of fluid through lines 66 and 71, to cylinders 26 and 34, in such a manner as to insure movement of the transfer head away from its discharging position to clear the pockets 12 before plungers 22 are advanced to discharge the lumps of dough from said pockets. That is, when fluid is admitted to line 64 and valve 65, it will first be directed by that valve through line 66 which communicates with that end of cylinder 26 which results in the transfer head being moved from its discharging to charging position. After the head reaches its charging position pressure builds up in line 66 and causes additional fluid pumped to the valve to be directed through line 71, with the result that piston 35 in cylinder 34 is actuated to discharge the lumps of dough from pockets 12.

The several valves are obtainable on the open market. In the case of the control valve 53, the flow of fluid from the supply line 51 to the two lines 54, 55 is controlled by the plunger 53ª and cam 57, the plunger having ports 104 and 105 therein for placing line 51 in communication with either line 54 or line 55. The plunger is cut away intermediate its ends to provide a space 106 with which drain line 56 communicates and, when one of lines 54, 55 is in communication with supply line 51, the other of said lines 54, 55 is in communication with said space and the drain line. Spring 107 tends to force the plunger toward cam 57. Valve 61, with its control plunger 61ª, functions in the same manner.

Figure 6:
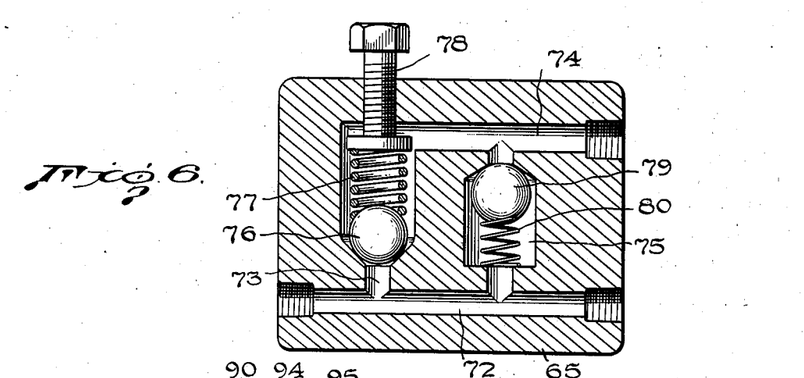
Figs. 6, 7 and 8 are detail sectional views of valves used in the conduits of the hydraulic system for actuating the dividing mechanism.

The pressure-controlled by-pass valve 65 is illustrated in Fig. 6. It comprises a duct 72 extending therethrough and to the opposite ends of which lines 64, 66 are connected. A by-pass passage 73 extends from duct 72 and communicates with another duct 74 to which line 71 is connected, and there is a second passage 75 which connects ducts 72, 74. Flow of fluid from duct 72 to duct 74 through passage 73 is controlled by a ball valve 76 normally held closed by a spring 77, the pressure of said spring on the ball for seating the latter being regulated by a screw 78. As will be understood, spring 77 is adjusted to hold ball valve 76 closed with a pressure corresponding to that which it is desired to place on plunger 25 in cylinder 26 through line 66, before fluid is delivered through line 71 to cylinder 35 for discharging the lumps from the scaling pockets. Flow of fluid through passage 75 between ducts 72, 74 is controlled by a ball valve 79 normally held closed by a spring 80, although pressure in duct 72, when line 64 is in communication with main supply line 59, will also tend to close this ball valve. However, when control valve 61 is actuated to connect lines 62ª, 62, from one end of cylinder 35, with the main supply line 59, and line 64 to drain 68, the pressure of fluid forced from the opposite end of cylinder 35 through line 71 connected to duct 74 will unseat ball valve 79, thus establishing communication between line 71 and drain 68.

Figure 7:
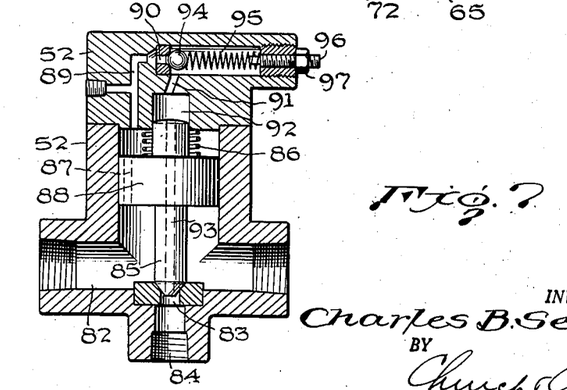

The construction of relief valve 52 and 60 is illustrated in Fig. 7. These valves comprise a passage 82, to which the sections of the main supply lines 51 and 59 are connected, and by-pass port 83 in said passage communicates with an outlet 84 to which the drain pipe (either 69 or 70) is connected. Port 83 is normally closed by a plunger valve 85 held against its seat by a spring 86, as well as by the pressure of the fluid being pumped, by reason of the fluid having access to the upper surface of the plunger through a port 87 in an enlargement 88 on the valve stem. In order to prevent abnormal pressure being imposed on the upper surface of this enlargement, the casing of the valve is also formed with a passage 89 which communicates through a valve-controlled passage 90 with a passage 91 which, in turn, discharges into a cavity 92 in the upper part of the valve casing and which is constantly in communication with port 84 by means of a passage 93 formed axially of the valve stem. Passage 90 is controlled by a check valve 94 held against its seat 95, the pressure of the spring on said check valve being regulated by a screw 96 which may be provided with a lock nut 97. By properly adjusting screw 96, fluid pressure will build up in the space above enlargement 88 until sufficient pressure is created to unseat valve 94, whereupon additional fluid flowing through passage 87 can escape through passage 89, port 90, passage 91, chamber 92 and the passage 93 through the valve stem to port 84 and the attached drain line. On the other hand, if, for any reason, excessive pressure should build up in the system at any point beyond the relief valve, as soon as the back pressure exceeds the normal pressure on the upper surface of enlargement 88, valve 85 will be unseated and relieve such back pressure.

Figures 8, 9:
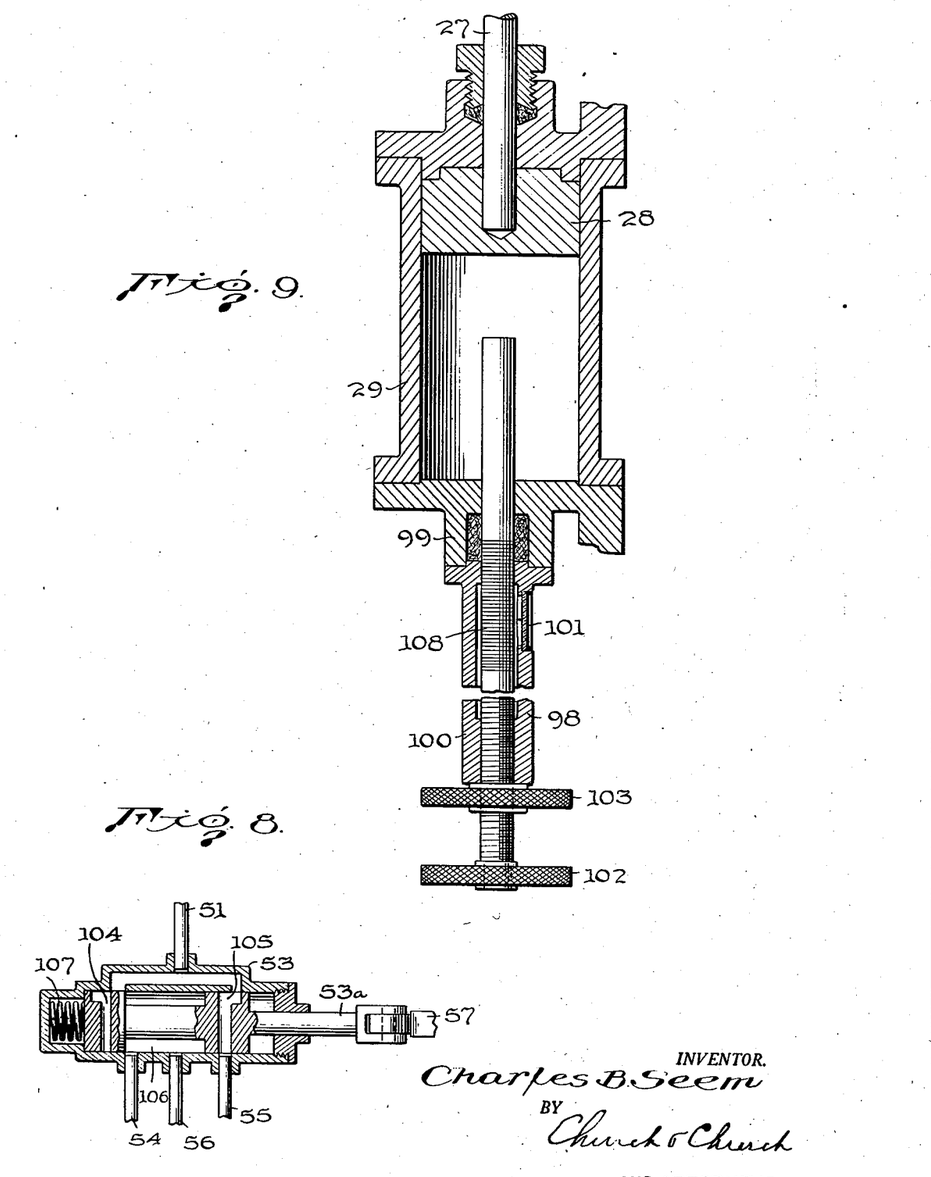
Fig. 9 is an enlarged, longitudinal sectional view of the adjusting mechanism for varying the quantity of dough admitted to the transfer head compartment from the hopper.

As more fully illustrated in Fig. 9, cylinder 29 for actuating the plunger 21 in transfer head compartment 16, is preferably provided with means for varying or regulating the amount of dough that can be withdrawn from hopper 10 into said compartment. This is quite important because, if the amount of dough deposited in compartment 16 is such that substantially all of it cannot be accommodated in the pockets 12, there is danger that a substantial quantity might remain in compartment 16 for an indefinite period of time, under which circumstances it is likely to be detrimentally affected during the subsequent operation of the machine. This control or regulation may be accomplished by providing an adjustable stop in the form of a screw 98 extending through the end of cylinder 29 to limit the retraction of piston 28 and, consequently, the retraction of plunger 21 in compartment 16. A packing gland 99 may be provided for the screw 98 which is threaded through an extension 100 on the cylinder and, if desired, a sight window 101 may be provided in the extension through which graduations 108 are visible, for determining the position of the screw axially of the cylinder. At its outer end, screw 98 is provided with a knurled nut 102 for facilitating adjustment thereof and, preferably, a locking nut 103 is also provided intermediate the operating nut 102 and extension 100. As will be apparent, adjustment of screw 98 axially of the cylinder 29 will vary the distance piston 28 can be retracted so that the quantity of dough admitted to compartment 16 can readily be varied in accordance with the adjustment of the indexing mechanism controlling the retraction of plungers 22 in the scaling pockets 12.

With the transfer head 17 positioned as shown in Fig. 1, the cycle of operations of the machine is as follows: Fluid flows from pump 50 through line 51, valve 53 and line 55 to the upper end of cylinder 29, to further retract plunger 21 in the transfer head chamber 16 to fill the latter with an increment of dough from hopper 10. At the same time, fluid drains from the lower end of cylinder 29 through line 54. The timing of the cam-operated valves is such that, after the chamber has been filled, the valve 61 will be actuated to place lines 62, 63 to cylinder 26, and lines 62, 62ª to cylinder 35, in communication with main supply line 59. This will cause fluid to enter cylinder 26 at the right hand end and to enter cylinder 35 at the left hand end (as viewed in Figs. 1 and 2), so that segment 19, together with the transfer head, is rocked to position chamber 16 in registry with the scaling pockets and the cross-plate 32 to be moved against the stops or sprockets 39, as shown in Fig. 2. During this movement of the transfer head and cross-plate, fluid will drain from cylinder 26 through line 66, and from cylinder 35 through line 71. With the transfer head in this position, as shown in Fig. 2, valve 53 directs fluid through line 54 to advance plunger 21 and force the dough from transfer head chamber 16 into the several scaling pockets. The amount of dough pressed into each pocket will depend upon the pressure imposed on plunger 21 in chamber 16 and the point to which the sprockets 39 have been adjusted to limit the retraction of cross-plate 32 which, in turn, limits the retraction of plungers 22 under the influence of the dough being forced into the pockets.

After the pockets 12 have been filled, valve 61 is actuated to reverse the flow of fluid to cylinder 26, fluid being supplied to that cylinder through line 64, valve 65 and line 66, so that rack 20 rocks segment 19 and the transfer head to return it to its original or charging position, as shown in Fig. 1. When the head has thus been restored to charging position, the pressure-controlled valve admits fluid to line 71, which causes the piston in cylinder 35 to advance the cross-plate 32 and plungers 22 to discharge the lumps from the scaling pockets. During this interval, the chamber in the transfer head will be filled with another increment of dough for the next cycle of operations.

With the present construction, it will be apparent that a minimum number of moving parts are exposed and that, by having the measuring or scaling pockets stationary, with the indexing or adjusting mechanism for the plungers in scaling pockets carried on this fixed portion of the machine, the safety of the attendant is materially increased.

Another advantage of the present construction is that the so-called knife, commonly found in machines of this type for severing dough delivered from the hopper into a compression box, is dispensed with in the sense that, in the present machine, the transfer head, itself, constitutes or performs the function of such a knife.

Also, the provision of a rocking transfer head, which might be said to serve the purpose of both the compression box and knife, in combination with the stationary scaling pockets, results in a rather overall compact structure.

It will be appreciated that the transfer head, the plunger therein, and the scaling pocket plungers need not necessarily be hydraulically actuated, but hydraulic operation is preferred as it not only lends to compactness in the structure, but it renders the machine highly susceptible to minute adjustments in the handling of doughs of different plasticity or densities. For instance, merely by adjusting the tension on spring 78 in pressure-controlled valve 65, more or less pressure can be exerted on the dough in the scaling pockets.

What I claim is:

1. In a dough divider, the combination of a hopper, a fixed scaling pocket, dough-receiving and discharging means for transporting and transferring successive increments of dough from the hopper into said pocket, and means for discharging dough from said pocket.

2. In a dough divider, the combination of a hopper having a discharge opening, a series of scaling pockets, a movable transfer head having a dough compartment therein, means for moving said head to alternately position said compartment in registry with said hopper opening and said pockets, means for forcing dough from said compartment into said pockets, and means for discharging the dough from said pockets.

3. In a dough divider, the combination of a hopper having a discharge opening, a fixed scaling pocket, an oscillatory member having a dough compartment therein movable into registry with said hopper opening and said pocket for transferring increments of dough from said hopper to said pocket, and means for removing the dough from said pocket.

4. In a dough divider, the combination of a hopper having a discharge opening, a series of scaling pockets, a transfer head having a dough compartment therein movable alternately into registry with said hopper opening and said pockets, a skirt portion on said head closing the hopper opening when said compartment is in registry with said pockets, means for discharging dough from said compartment into said pockets, and means for removing the dough from said pockets.

5. In a dough divider, the combination of a hopper having a discharge opening, a series of stationary scaling pockets, an oscillatory transfer head having a dough compartment movable alternately into registry with the hopper opening and said pockets, a plunger in said compartment, a hydraulic cylinder on said head for reciprocating said plunger to force dough from said compartment into said pockets, plungers in said pockets, and a hydraulic cylinder for actuating said pocket plungers to discharge dough from the pockets.

6. In a dough divider, the combination of a hopper having a discharge opening, a series of stationary scaling pockets, an oscillatory transfer head having a dough compartment therein movable alternately into registry with said hopper opening and pockets, hydraulically operated means for oscillating said head, a hydraulically operated plunger in said compartment for forcing dough from the compartment into said pockets, hydraulically operated plungers in said pockets for discharging dough therefrom, and means for controlling said hydraulic oscillating means for the transfer head and the hydraulically operated pocket plungers to render the latter operable to empty the pockets only when said compartment is in registry with said hopper opening.

7. In a dough divider, the combination of a hopper having a discharge opening, a series of stationary scaling pockets, a transfer head having a dough compartment therein, said head being movable alternately to position said compartment in registry with said pockets and to position said compartment in registry with said hopper opening with said pockets unobstructed by said head, means for discharging dough from said compartment into said pockets, plungers in said pockets, hydraulically operated pistons for oscillating said head and advancing said plungers to discharge dough from said pockets, a pump for supplying fluid pressure to said pistons, and means controlling the flow of fluid to the pistons comprising means for preventing operation of the pocket plunger piston until a predetermined pressure is applied to the head oscillating piston.

8. In a dough divider, the combination of a stationary divider head having an arcuate inner surface, a hopper mounted on said head having an opening discharging into the interior of said head, a series of scaling pockets rigidly mounted on said head and opening into the interior of the latter, a transfer head within said divider head having an arcuate exterior conforming to the arcuate surface of the divider head, said transfer head having a dough compartment therein, means for oscillating said transfer head to alternately position said compartment in registry with said hopper opening and said pockets, and means for ejecting dough from said compartment into said pockets.

9. In a dough divider, the combination of a divider head, a series of fixed scaling pockets, ejector plungers in said pockets, each plunger having a stem thereon, a pressure-operated plate engageable with but detached from said stems for advancing said plungers in their pockets and for limiting the retraction of the plungers in their pockets, supports fixed with respect to the pockets on which said plate is slidable longitudinally of the pockets and stops carried by said supports and adjustable longitudinally of the pockets engageable with said plate for limiting the retraction of said plate and plungers.

10. In a dough divider, the combination of a pair of fixed scaling pockets, an ejector plunger having a stem in each pocket, a reciprocatory plate engageable with said stems for advancing the plungers and for limiting the retraction thereof, supports rigidly mounted at opposite sides of said pair of pockets, said plate being slidable on said supports, abutments on said supports for limiting retraction of said plate, and means for adjusting said abutments on said supports longitudinally of the pockets.

11. In a dough divider, the combination of a pair of fixed scaling pockets, plungers slidable in said pockets, stems on said plungers projecting from the pockets, supports at opposite sides of said pockets, a plate slidable on said supports longitudinally of the pockets and positioned in the path of said plunger stems, stops adjustable on said supports longitudinally of the pockets for limiting movement of said plate, and means for simultaneously adjusting said stops.

12. In a dough divider, the combination of a pair of stationary scaling pockets, plungers slidable in said pockets, plunger stems projecting from said pockets, fixed supports at opposite sides of said pockets, adjusting screws threaded in said supports for movement longitudinally of the pockets, a stop-plate slidable on said supports longitudinally of the pockets and engageable with said plunger stems, means for advancing and retracting said stop plate, and abutments on said screws for limiting the retraction of said stop-plate.

13. In a dough divider, the combination of a pair of fixed open-ended scaling pockets, plungers slidable in said pockets, stems on said plungers exposed at the exterior of the divider, a plate at the exterior of the machine engageable with said stems, means for reciprocating said plate longitudinally of the pockets, abutments carried by fixed portions of the divider at the exterior thereof for limiting the retraction of said plate, and means for adjusting said abutments longitudinally of the pockets.

14. In a dough divider, the combination of a pair of stationary open-ended scaling pockets, plungers slidable in said pockets, stems on said plungers projecting from one end of the pockets, fixed supports at opposite sides of said pockets, adjusting screws threaded in said supports for movement longitudinally of the pockets, a plate at the exterior of the machine engageable with said plunger stems, means for advancing and retracting said plate, and stops on said adjusting screws for limiting the retractive movement of said plate.

15. In a dough divider, the combination of a pair of stationary open-ended scaling pockets, plungers slidable in said pockets, stems on said plungers projecting from one end of the pockets, fixed supports at opposite sides of said pockets, adjusting screws threaded in said supports for movement longitudinally of the pockets, a plate at the exterior of the machine engageable with said plunger stems, means for advancing and retracting said plate, stops on said adjusting screws for limiting the retractive movement of said plate, and a graduated indexing rod connected to and movable in unison with one of said adjusting screws.

16. In a dough divider, the combination of a stationary divider head, a series of scaling pockets rigid with said head, ejector plungers in said pockets, stems on said plungers, the lower portions of the pocket walls projecting beyond the upper portions thereof, a sectional stem guide on the extended lower portions of the pocket walls, the upper section of said stem guide being removable whereby the plungers with their stems may be withdrawn from their pockets, and releasable means for securing said guide sections together.

17. In a dough divider comprising a hopper, a plurality of scaling pockets and a transfer head having a dough compartment therein in which dough is transferred from said hopper to said pockets, a plunger in said compartment for discharging dough therefrom, means for reciprocating said plunger, and means for varying the retractive movement imparted to said plunger.

18. In a dough divider, the combination of a hopper, a fixed scaling pocket, a transfer head having a dough compartment therein in which dough is transferred from said hopper to said pocket, a plunger in said compartment for discharging dough therefrom into said pocket, fluid actuated means for reciprocating said plunger comprising a cylinder having a piston therein connected to said plunger, and means for varying the extent of the retractive movements of said piston and plunger.

19. In a dough divider, the combination of a hopper, a fixed scaling pocket, a transfer head having a dough compartment therein in which dough is transferred from said hopper to said pocket, a plunger in said compartment for discharging dough therefrom into said pocket, fluid actuated means for reciprocating said plunger comprising a cylinder having a piston therein connected to said plunger, and a stop for limiting the retraction of said piston and plunger, said stop being adjustable axially of said cylinder for varying the retractive movement permitted said piston and plunger.

20. In a dough divider, the combination of a hopper, a fixed scaling pocket, a transfer head having a dough compartment therein in which dough is transferred from said hopper to said pocket, a plunger in said compartment for discharging dough therefrom into said pocket, fluid actuated means for reciprocating said plunger comprising a cylinder having a piston therein connected to said plunger, a stop screw extending axially of said cylinder engageable with said piston for limiting the retraction of the latter, and means for adjusting said stop axially of the cylinder for varying the retractive movement permitted said piston.

21. In a dough divider, the combination of a hopper having a discharge opening, a scaling pocket remote from said discharge opening, a transfer member having a dough compartment therein in which dough is received from said hopper, means for moving said transfer member to position said dough compartment in registry with said scaling pocket, means for moving dough from said compartment into said pocket, and means for discharging dough from said pocket.

CHARLES B. SEEM.